United States Patent [19]

Brennen et al.

[11] 4,394,614
[45] Jul. 19, 1983

[54] STATIC VAR GENERATORS

[75] Inventors: Michael B. Brennen, Wilkins Township, Allegheny County; Laszlo Gyugyi; Eric J. Stacey, both of Penn Hills Township, Allegheny County, all of Pa.

[73] Assignee: Westinghouse Electric Corp., Pittsburgh, Pa.

[21] Appl. No.: 302,349

[22] Filed: Sep. 15, 1981

[51] Int. Cl.³ .............................................. H02J 3/18
[52] U.S. Cl. ....................................... 323/210; 363/54
[58] Field of Search ...................... 323/209, 210, 211; 363/50, 52–54; 361/100–101

[56] References Cited

U.S. PATENT DOCUMENTS

| | | | |
|---|---|---|---|
| 3,999,117 | 12/1976 | Gyugyi et al. | 323/211 |
| 4,047,097 | 9/1977 | Gyugyi et al. | 323/211 |
| 4,063,301 | 12/1977 | Lye | 363/54 X |
| 4,104,576 | 8/1978 | Frank | 323/210 |
| 4,339,705 | 7/1982 | Kelley | 323/210 |

Primary Examiner—William M. Shoop
Assistant Examiner—Peter S. Wong
Attorney, Agent, or Firm—Benjamin Hudson, Jr.

[57] ABSTRACT

There is provided by this invention a static VAR generator having an auxiliary shutdown firing pulse generator that initiates a thyristor controlled inductive current to cancel any capacitive current supplied by the static VAR generator in the event of failure of the VAR generator's control means monitoring the capacitive current requirements.

2 Claims, 3 Drawing Figures

STATIC VAR GENERATORS

CROSS-REFERENCE TO RELATED APPLICATION

This application is related to the application Ser. No. 303,299, filed Sept. 15, 1981.

BACKGROUND OF THE INVENTION

1. Field of the Invention

This invention relates generally to static VAR generators and more particularly to static VAR generators having auxiliary shutdown firing generators for isolation of the static VAR generator from the AC network in the event the VAR generator malfunctions.

2. Description of the Prior Art

In order to ensure shutdown capability, a full inductor current must always be maintained in the thyristor phase controlled inductor of the VAR generator during its shutdown. In the present VAR generator designs, the firing instance of the phase control pulses is derived from the power system's voltage in several stages. First, potential transformers supply input signals to a phase-lock type synchronous timing circuit. The synchronous timing circuit provides the necessary information for a thyristor phase angle control circuitry. Finally, the phase control determines the firing instance of the necessary full current phase control firing pulses. The phase control pulses obtained are transmitted from the phase control circuitry to a light emitting diode drive and protection circuitry. When a phase control pulse is received, the LED drive generates a light pulse that turns on the optically coupled firing circuits in the high voltage thyristor array of the phase controlled inductor. In order to obtain a full inductor current successfully, all of the above circuitry must be operational. One of the major concerns of both the supplier and the user of static VAR generators is the assurance of long life and reliable operation of the equipment. In some cases the shut down of the VAR generator, due to an internal failure, may require shutting down a complete system. One example of a shutdown scheme is found in U.S. Pat. No. 4,047,097, entitled "Apparatus And Method For Transient Free Energization And Deenergization Of Static VAR Generators", assigned to the assignee of the present invention.

The VAR generator power circuit basically consists of a fixed capacitor bank and a thyristor controlled inductor bank. When both the capacitor and the inductor banks are connected or switched across the AC voltage, the capacitor and inductor currents cancel each other out, therefore, the power line current supplied to the combined banks becomes practically zero. This zero current then can be interrupted in an easy, transient free manner by the main circuit breaker of the VAR generator during a normal VAR generator shutdown. If, at any time, during a shutdown the thyristor controlled inductor is inoperative, the main circuit breaker would have to interrupt capacitive discharge current with the possibility of the arc restriking in the circuit breaker and causing severe damage to the capacitor due to overvoltages. When the main circuit breaker is opened to deenergize a capacitor bank, the initial voltage across the breaker is zero. A half cycle later when the system voltage has reversed, and the capacitor voltage is still the same as when the breaker started opening, the voltage across the breaker is doubled. If the breaker restrikes on this double voltage, a high oscillatory current flows. The current is high because the voltage is doubled.

SUMMARY OF THE INVENTION

There is proposed by this invention an auxiliary shutdown firing pulse generator to maintain gate pulses that results in a maximum inductor current for the described shutdown in the case of failure of the control circuitry of the VAR generator. In order to implement the desired auxiliary backup firing function, the gate pulses sent to the thyristor array are continuously monitored by the backup control circuitry. If any missing pulses are detected, a maximum current request is activated which generate gate pulses for the full inductor current necessary for limiting capacitive discharge current when disconnecting the VAR generator from the AC network. In order to increase the reliability of the auxiliary backup firing circuitry, shutdown pulses are derived by using only a minimal amount of sensing circuitry to indicate that sufficient firing energy is available for the firing of the thyristor array.

DESCRIPTION OF THE PREFERRED EMBODIMENT

Figure 1:
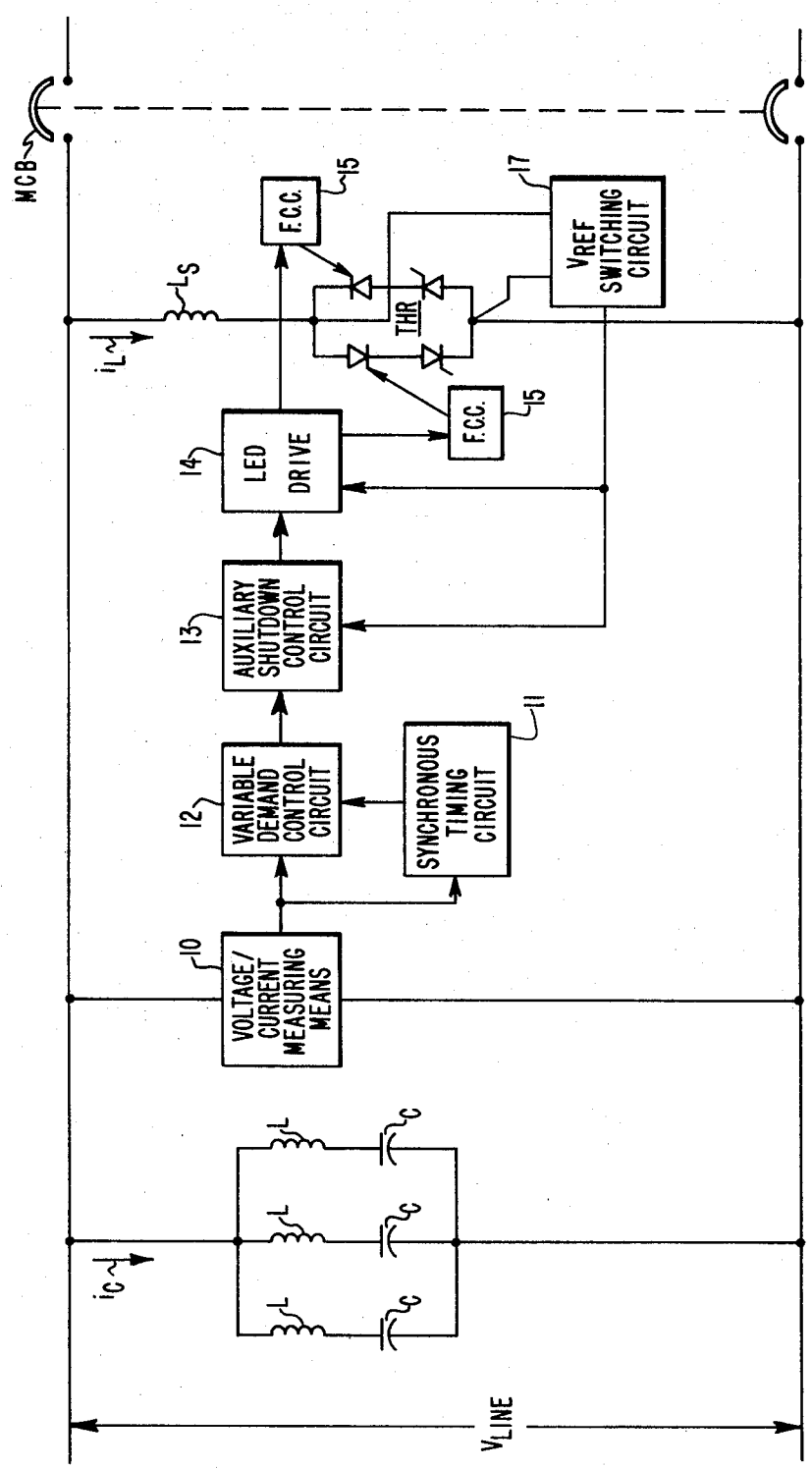
FIG. 1 is a block diagram illustrating a static VAR generator incorporating the principles of this invention.

Referring to FIG. 1 there is shown a static VAR generator incorporating the principles of this invention. Although only one phase is shown, this figure is typical of all three phases of a multi-phase system. There is shown a capacitor bank C with harmonic filters L connected across one phase of an AC network. A compensating inductance LS is connected to the system by means of an anti-parallel thyristor array THR. Also connected across the AC network is a voltage/current measuring means 10 for continuously monitoring and supplying a control signal representative of the AC network conditions. The signal VCM from the control circuitry 10 is supplied to a synchronous timing circuit 11 whose primary function is to provide proper timing waves to ensure that the thyristor controlled inductance LS is operated in synchronism with the AC network voltage. This synchronous timing circuit may be similar to that described in U.S. Pat. No. 3,999,117, entitled "Method And Control Apparatus For Static VAR Generator And Compensator" issued to L. Gyugyi and M. B. Brennen. The signal VCM from the voltage/current measuring means 10 is also inputted into a VAR demand control circuit 12 which analyzes the voltage and current information contained therein to determine the amount of inductive current that must be switched to compensate the network so as to keep its voltage variation within specified limits. Also inputted into the VAR demand control circuit 12 is a signal STC from the synchronous timing circuit 11 to ensure that all switching of inductive current is in synchronization with the AC network voltage. The signal VDC from the VAR demand control circuit 12 is inputted into an auxiliary shutdown control circuit 13 which will be described in more detail later. This control circuit 13 incorporates the principles of the present invention. The output signal ASC of the auxiliary shutdown control circuit 12 is inputted into an LED drive module 14 which provides pulse amplification, sufficient to turn on a string of light emitting diodes, that are optically coupled to light sensitive gate firing circuits FCC 15 of the high voltage thyristor array. Sufficient energy must be stored within the firing circuits FCC so that upon receiving a signal from the LED drive modules the thyristors can be fired to switch in the predetermined amount of inductive current necessary to compensate the AC network. However, prior to initiating a firing pulse from the firing circuits FCC, a voltage reference switching circuit 17 monitors the amount of stored energy contained in the firing circuits available for the thyristor array and inputs a signal to the auxiliary shutdown circuit and the LED drive module that indicates that energy available in the firing circuits is sufficient to ensure instantaneous firing of the thyristors when signaled. Main circuit breaker MCB is provided for connecting the static VAR generator into the AC network.

Figure 2:
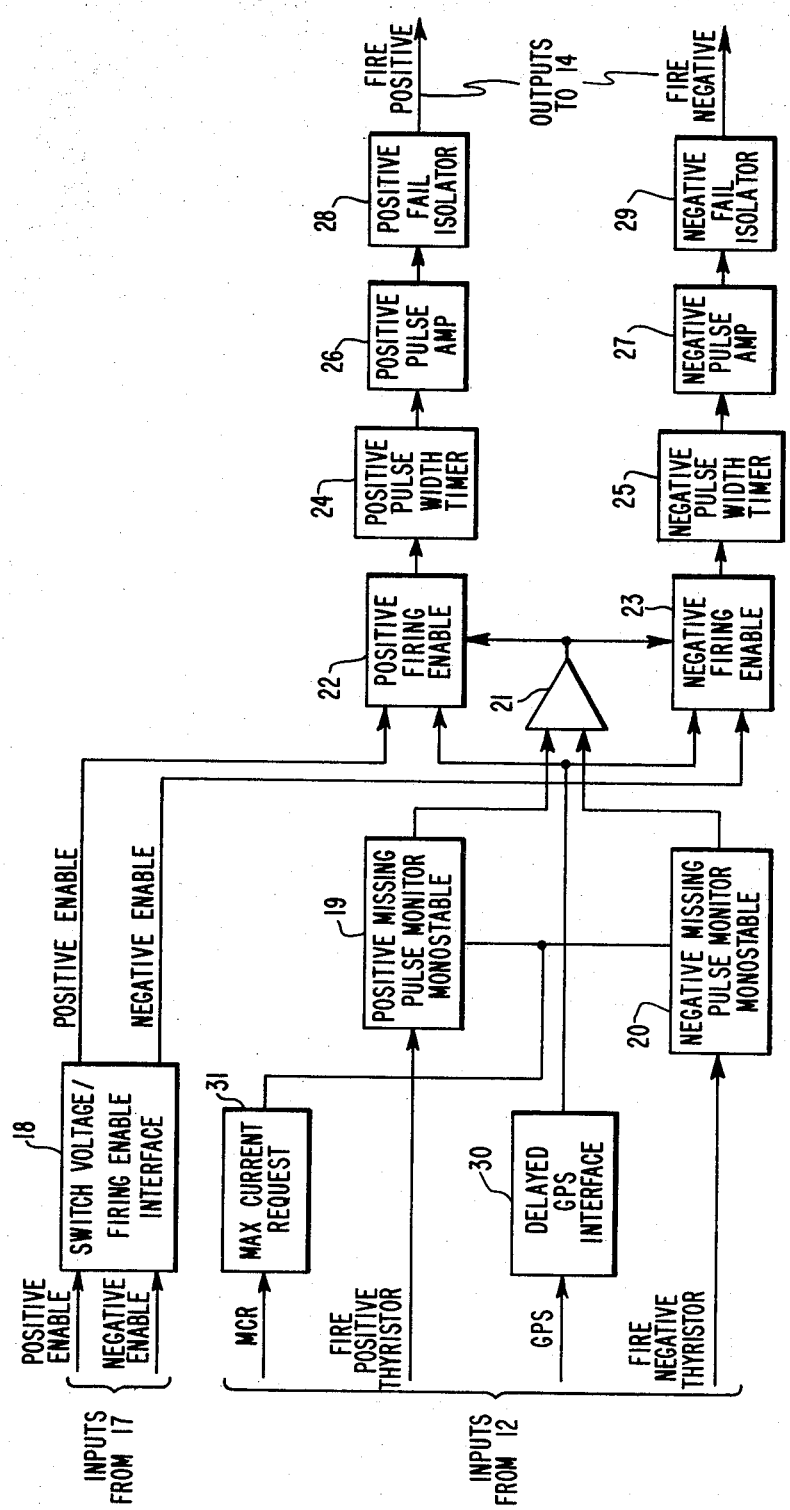
FIG. 2 is a basic circuit block diagram for the auxiliary shutdown firing pulse generator incorporating the principles of this invention.

Shown in FIG. 2 is a basic circuit block diagram for the auxiliary shutdown control circuit 13. The input from the voltage reference switching circuit 17 VRSC consists of a positive enable input and a negative enable input which are fed into a switch voltage firing enable interface 18 as shown. These inputs enable firing of the inductor thyristor switches at positive system voltage peaks and negative system voltage peaks, respectively. The input corresponding to firing during positive system voltage is fed to a positive firing enable circuit and the input for firing during negative system voltage is fed to a negative firing enable circuit. The positive and negative firing enabling circuits make a confirmation that individual thyristor firing circuits, FCC, are charged from the system voltage and that they are ready for simultaneous turn on of each thyristor in the respective thyristor array. Once it is confirmed that the firing circuits, FC, are charged, the instant of firing, expressed in a "firing angle," $\alpha$, that is measured from each voltage peak across the thyristor controlled inductor, must be selected according to a known inverse, non-linear firing angle/fundamental inductor current function. For the implementation of a full inductor current (conduction angle, $\phi = 180°$ for each half cycle) the firing pulse should ideally be issued at $\alpha = 0°$, that is exactly at the peak of the line to line voltge. Generally, in steady state, a firing pulse should not be issued before the voltage peak, because it is no effect when an already conducting thyristor is fired. A conducting thyristor would still turn off after the next inductor current zero crossing, irrespective of such a premature firing pulse. There is a transient case, however, when firing before the voltage peak results in a particular inductor current. If the thyristor controlled inductor operates with less than full (including zero) current, the thyristor is already turned off before the voltage peak. Since, when the thyristor is not conducting, a firing pulse will initiate conduction, the thyristor in this case can be turned on before a voltage peak. Depending on whether it was turned on before a positive or a negative peak, the resulting inductor current will carry a respective positive or negative DC component.

Figure 3:
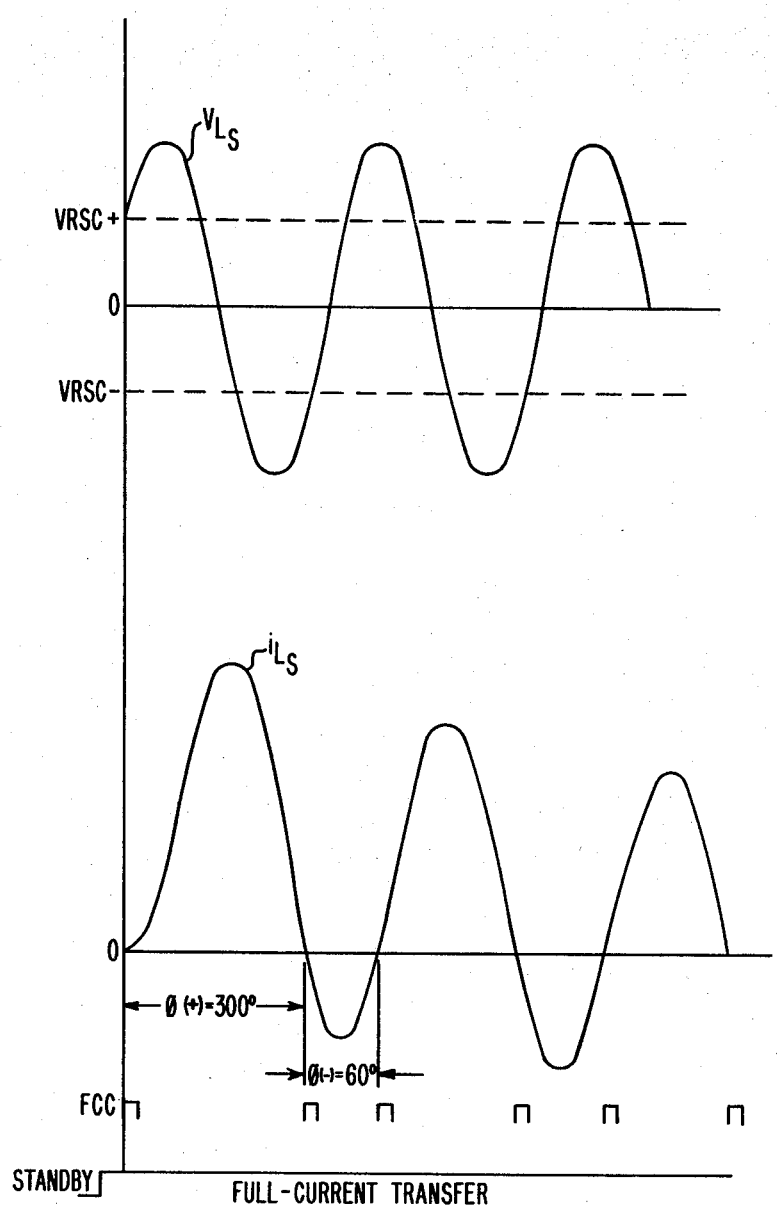
FIG. 3 illustrates the full inductor current waveform, the voltage waveform across the thyristor array; and firing signals from the voltage reference switching circuit.

In FIG. 3, a positive DC component is indicated. The measure of prematurity of firing and the resulting magnitude of the DC current is represented by the voltage reference switching signal, typically selected at approximately 50% of the nominal voltage value. This results in positive current conduction angle $\phi = 300°$ in a corresponding $\phi - = 60°$ of the first cycle. If the voltage reference switching circuit is activated at higher than 50% of the nominal voltage, the DC component in the inductor current decreases in a calculable, non-linear manner. Firing at the voltage reference switching was selected because it represents the case when the automatic shutdown control circuit uses the voltage reference switching signal for phase controlled timing in switching the thyristor controlled inductor. While such a full current phase control results in an undesirable DC inductor current component, the main merit of this technique lies in its extreme simplicity and therefore, high reliability. It operates without $\alpha$-function generation, phase locked or other synchronous timing and gating circuitry. Also, it uses a signal for timing the full current firing pulse, that is already an essential part of the existing optically coupled thyristor array firing circuit.

Referring to FIG. 2, based upon the above principle in its normal state, the auxiliary shutdown control circuit is in a full inductor current mode. When $\alpha$-controlled pulses are sent from the VAR demand control 12, either fire positive thyristor or fire negative thyristor, they are detected by the separate positive and negative missing pulse monitor monostables 19 and 20. $\alpha$-controlled pulses are allowed to override the basic full current pulses via a full current/standby transfer logic gate 21 operated by the missing pulse monitors. When the auxiliary shutdown control circuit is in a standby mode, it stops issuing firing pulses by disabling the positive and negative enable inputs into the positive and negative firing enable circuits 22 and 23 which indicates that the firing circuits FCC 15 are charged. In order to prevent a weak firing pulse through short circuiting of an on-going full current firing pulse by the standby transfer, monostable pulse width timers 24 and 25 are employed to ensure a constant uninterruptable firing pulse length delivered by the auxiliary shutdown control circuit. The pulse width timers are followed by appropriate pulse amplifiers 26, 27 and failure isolators 28, 29, the latter to allow $\alpha$-control pulses in case of an auxiliary shutdown control circuit failure.

Referring again to FIG. 2, an external gate pulse suppressed signal interface 30, inhibits the shutdown gate pulses after the main circuit breaker MCB has opened, in order to terminate the self-oscillation of the capacitor reactor bank complex involved in a shutdown. Generally, the thyristor array's firing must be terminated before the array drops below a predetermined value. The approximate 50% voltage across the thyristor array is necessary to provide the necessary firing energy to the optically coupled individual thyristor firing circuits in the thyristor array that, themselves, obtain defined energy from the system voltage across the thyristor array. The gate pulse suppress signal GPS must be transmitted to the auxiliary shutdown control circuit in order to stop the full current firing pulses. Furthermore, the removal of the gate pulse suppress signal must be delayed by approximately one cycle in the auxiliary shutdown circuit to prevent a single full current pulse on startup before the first $\alpha$-control pulse is issued and then sensed by the respective missing pulse monitor.

An external maximum current request signal MCR interface 31 is also shown in FIG. 2. This request during shutdown, overrides the α-control pulses by resetting the missing pulse monitors. The shutdown pulse generation is then activated irrespective of the presence of α-control pulses.

It can be readily seen that there is provided by this invention a novel auxiliary shutdown firing pulse generator which provides full inductor current phase control firing pulses based only on thyristor switch voltage level sensors and appropriate fixed time delays, unless overridden by an external maximum current request or an external gate pulse suppression.

Although there has been illustrated and described a specific embodiment, it is clearly understood that the same were merely for purposes of illustration and that changes and modifications may readily be made therein by those skilled in the art without departing from the spirit and scope of this invention.

We claim as our invention:

1. A static VAR generator, comprising:
   (a) a capacitive current means disposed for connection into an AC network;
   (b) a monitoring means connected to said AC network for monitoring the capactive current requirement of the AC network;
   (c) a control means connected to said capacitive current means and said monitoring means for causing connection of said capacitive current means into said AC network in response to the reactive requirements of said AC network;
   (d) switching means for connecting said capacitive current means into said AC network; and
   (e) an auxiliary shutdown means for allowing said switching means to disconnect said capacitive current means from the AC network without causing restriking transients in the event of failure of said monitoring means or said control means.

2. A static VAR generator as recited in claim 1 wherein said auxiliary shutdown means is generally comprised of an auxiliary firing circuit disposed to determine a firing angle α for inserting a thyristor controlled inductive current means to cancel said capacitive current means in said AC network, said firing angle α being measured as a function of the voltage across said thyristor controlled inductive means, and said auxiliary firing circuit further comprising positive and negative pulse monitor means disposed to monitor the control signals of said control means and activate said auxiliary firing circuit in the event of failure of said control means controlling said capacitive current means in said AC network.

* * * * *